H. B. MASSER.
Ice Cream Freezer.
No. 5,960.
2 Sheets—Sheet 1.
Patented Dec. 12, 1848.
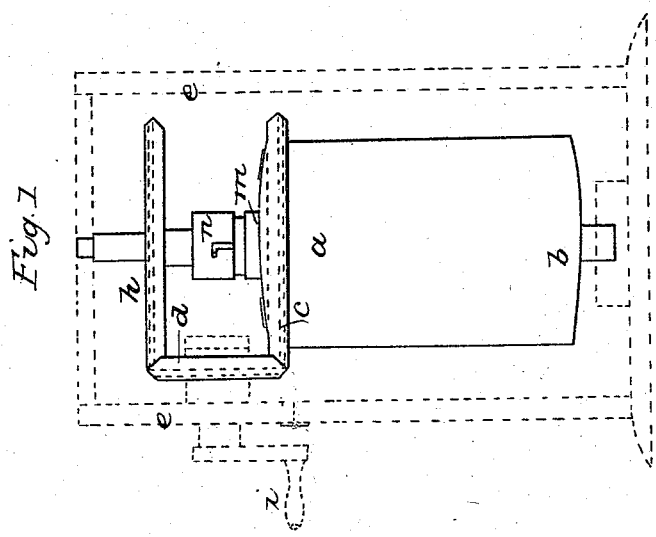
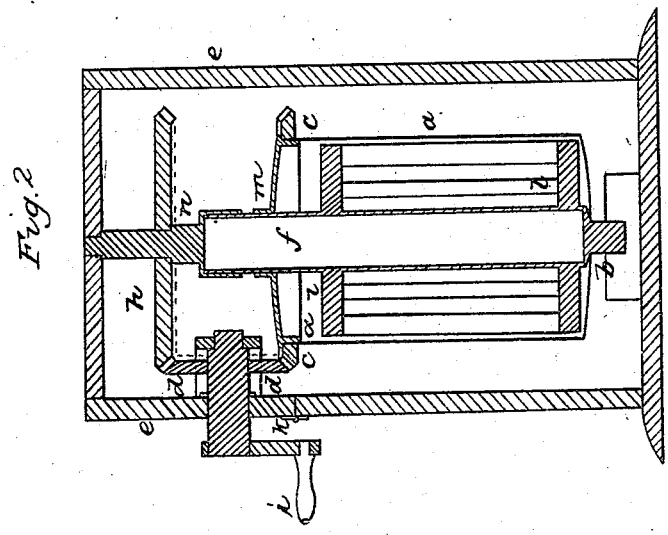

H. B. MASSER.
Ice Cream Freezer.
No. 5,960.
2 Sheets—Sheet 2.
Patented Dec. 12, 1848.
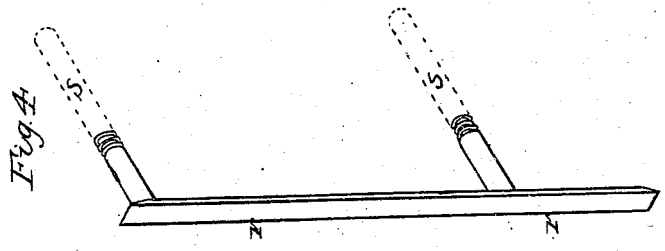
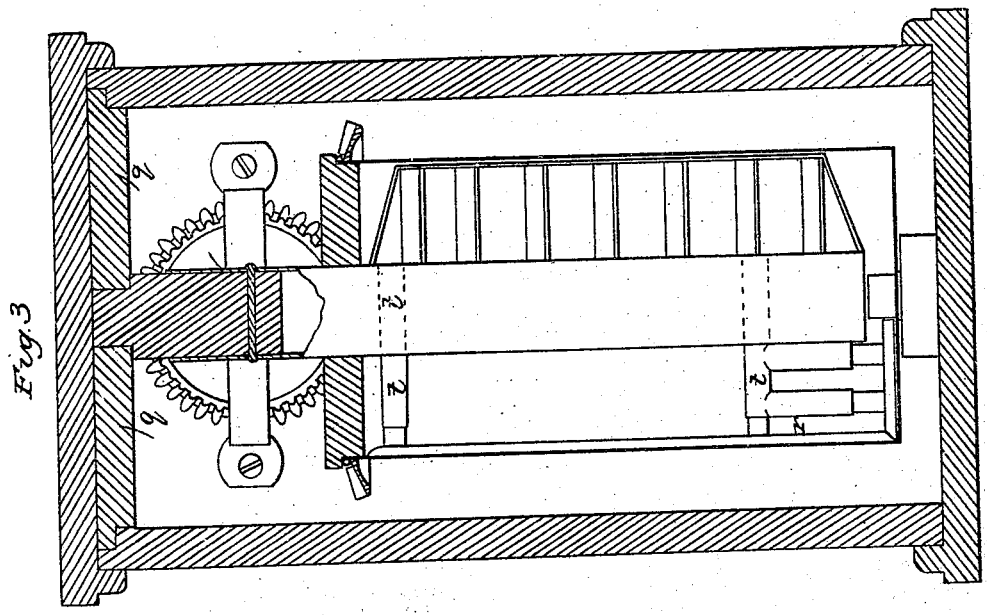

UNITED STATES PATENT OFFICE.

H. B MASSER, OF SUNBURY, PENNSYLVANIA.

ICE-CREAM FREEZER.

Specification forming part of Letters Patent No. 5,960, dated December 12, 1848; Reissued June 28, 1859, No. 751.

*To all whom it may concern:*

Be it known that I, H. B. MASSER, of Sunbury, in the county of Northumberland and State of Pennsylvania, have invented certain new and useful Improvements in Ice-Cream Freezers, and that the following is a full, clear, and exact description of the principle or character which distinguishes them from all other things before known and of the usual manner of making, modifying, and using the same, reference being had to the accompanying drawing, in which—

Figure 1 is the apparatus with the outer can shown transparent and in red lines. Fig. 2 is a section through the freezer.

The same letters indicate like parts in all the figures.

My invention consists in constructing a freezer so as to revolve a dasher within it, and also at the same time to turn the freezer in an opposite direction within the ice box, and I form the spindle of the dasher large and hollow for the purpose of containing ice.

The construction is as follows: The freezer $a$ is placed within a suitable box, and on its lower end there is a projection $b$, that serves for a spindle, on which it turns; this spindle is let into a proper step in the bottom of the box; around the upper edge of the freezer there is a bevel gear $c$, that is driven by a bevel pinion $d$, the axis of which is horizontal, and has its bearing in the box $e$; the cover of the freezer fits tight, and at its center has a collar $m$ through which the spindle $f$ passes, and on which it turns. This spindle $f$ is hollow, and large enough to be filled with ice; the lower end fits into a depression in the bottom of the freezer, and the collar $m$ of the freezer cover surrounds it near the top, above which there is a cap piece $n$ that fits on with a bayonet fastening and can be removed to put in ice. On this upper part there is a bevel wheel $h$ that is of the same diameter and number of teeth as the gear on the top of the freezer; this also works into the pinion $d$, by which it is driven in a direction opposite to that of the freezer; the top of the spindle has also a bearing in the top of the box that holds the ice around the freezer; two wings $l$ are affixed to the spindle, forming the dasher to beat the cream with. The shaft of the pinion $d$ has a crank $i$ on its outer end, that projects through the outer box, by which it is turned, and that part of the box that has the bearing of said shaft in it is hinged at $k$, so as to allow it to fall over and ungear to remove the freezer.

Having thus fully described my improved freezer, what I claim therein as new is—

The forming the spindle of the beater within the freezer hollow, so as to be filled with ice for the more expeditious freezing of the cream, and in combination therewith the construction and arrangement of the freezer $a$ and beater $l$, substantially in the manner and for the purpose set forth.

H. B. MASSER.

Witnesses:
  WILLIAM HOOVER,
  JOHN YOUNG.

[FIRST PRINTED 1913.]